(12) United States Patent
Fretwell et al.

(10) Patent No.: US 11,943,493 B2
(45) Date of Patent: Mar. 26, 2024

(54) REMOTE MASTER CONTROL ROOM MONITORING

(71) Applicant: ATEME, Velizy Villacoublay (FR)

(72) Inventors: Kaleb Fretwell, Douglas Park (AU); Mark Morgant, Five Dock (AU); Gautier Vandomme, Singapore (SG); Sassan Pejhan, Princeton, NJ (US)

(73) Assignee: ATEME, Velizy Villacoublay (FR)

( * ) Notice: Subject to any disclaimer, the term of this patent is extended or adjusted under 35 U.S.C. 154(b) by 0 days.

(21) Appl. No.: 17/370,417

(22) Filed: Jul. 8, 2021

(65) Prior Publication Data

US 2022/0014806 A1  Jan. 13, 2022

(30) Foreign Application Priority Data

Jul. 13, 2020 (EP) .................................. 20305799

(51) Int. Cl.
| | | |
|---|---|---|
| H04N 21/236 | (2011.01) | |
| H04N 19/177 | (2014.01) | |
| H04N 21/2365 | (2011.01) | |
| H04N 21/238 | (2011.01) | |
| H04N 21/2389 | (2011.01) | |
| H04N 21/24 | (2011.01) | |
| H04N 21/266 | (2011.01) | |
| H04N 21/2662 | (2011.01) | |

(52) U.S. Cl.
CPC ..... *H04N 21/23655* (2013.01); *H04N 19/177* (2014.11); *H04N 21/2389* (2013.01); *H04N 21/2404* (2013.01); *H04N 21/2662* (2013.01)

(58) Field of Classification Search
CPC ......... H04N 21/23655; H04N 21/2389; H04N 21/2404; H04N 21/2662; H04N 19/177
USPC ...................................................... 375/240.01
See application file for complete search history.

(56) References Cited

U.S. PATENT DOCUMENTS

| | | | |
|---|---|---|---|
| 6,707,829 B1 * | 3/2004 | Hanks ................ | H04N 21/6118 714/2 |
| 6,868,234 B1 * | 3/2005 | Tammela ............ | H04J 14/0294 398/4 |
| 9,191,605 B1 | 11/2015 | Evans et al. | |
| 9,571,826 B1 * | 2/2017 | Azralon ............. | H04N 21/6473 |
| 2002/0100054 A1 | 7/2002 | Feinberg et al. | |

(Continued)

OTHER PUBLICATIONS

Viola et al., "QoE-based enhancements of Chunked CMAF over low latency video streams," 2019 IEEE International Symposium on Broadband Multimedia Systems and Broadcasting (BMSB), IEEE, Jun. 5, 2019, pp. 1-6.

(Continued)

*Primary Examiner* — Dominic D Saltarelli
(74) *Attorney, Agent, or Firm* — Faegre Drinker Biddle & Reath LLP

(57) ABSTRACT

A method for monitoring video streams is proposed, which comprises: generating, by one or more source encoders, encoded multimedia content signals based on the encoding of monitored video streams respectively corresponding to one or more monitoring points along a workflow chain of a video broadcasting headend configured for one or more video channels broadcasted by the headend, and transmitting the encoded multimedia content signals to a remote monitoring device through a content distribution network.

20 Claims, 6 Drawing Sheets

(56) References Cited

U.S. PATENT DOCUMENTS

| | | | |
|---|---|---|---|
| 2002/0108128 A1* | 8/2002 | Lash | H04N 21/435 |
| | | | 725/148 |
| 2005/0138081 A1* | 6/2005 | Alshab | G06Q 10/06 |
| 2006/0104208 A1* | 5/2006 | Walker | H04L 41/0677 |
| | | | 370/242 |
| 2009/0122144 A1* | 5/2009 | Latham | G08B 13/19697 |
| | | | 348/155 |
| 2009/0122879 A1* | 5/2009 | Howe | H04N 19/159 |
| | | | 375/E7.279 |
| 2009/0154369 A1* | 6/2009 | Helvig | H04L 41/5087 |
| | | | 370/252 |
| 2010/0017835 A1* | 1/2010 | Wilson | H04N 21/6175 |
| | | | 725/127 |
| 2013/0229511 A1* | 9/2013 | Oostendorp | G06T 7/0004 |
| | | | 348/92 |
| 2018/0270482 A1* | 9/2018 | Edpalm | H04N 19/137 |

OTHER PUBLICATIONS

Search Report and Search Opinion issued in related application EP 20305799.7, dated Feb. 5, 2021, 9 pages.

* cited by examiner

REMOTE MASTER CONTROL ROOM MONITORING

CROSS-REFERENCE TO RELATED APPLICATIONS

This application claims priority benefit under 35 U.S.C. § 119(d) from European Patent Application No. 20305799.7, filed Jul. 13, 2020, the disclosure of which is incorporated by reference herein in its entirety.

FIELD

The present disclosure relates to the field of TV broadcasting, and more particularly to remote monitoring of master control rooms associated with TV broadcasting.

BACKGROUND

At the heart of the operations of all major TV broadcasters (over the air, satellite, cable or OTT) is the Master Control Room (MCR). These are typically staffed 24/7, with dozens and even hundreds of TV channels being monitored for any disruption in service or quality issues. It is critical for staff to be able to detect issues and take remedial action as soon as possible and with minimal loss of time to minimize the disruption of services to millions of watching customers.

MCRs are typically staffed by a sizeable crew, operating in multiple shifts (two or three). Providing physical access to the MCRs may not always be possible or pragmatic. During a health crisis—such as the COVID-19 pandemic—or severe weather conditions such as a snowstorm, staff may not be permitted to access the physical location. Also, some of these operations centers are typically located in remote areas—away from urban centers to minimize electronic interference, or because they use high-powered transmitters that need to be located away from residential areas. As such, it may be difficult to recruit enough qualified technicians willing to commute daily to such remote locations.

There is therefore a need to provide remote monitoring capabilities to staff members located in remote sites or at home. Normally, one solution for such remote monitoring is to use Virtual Private Network (VPN) connections. In the case of monitoring hundreds of TV channels (many of them high bitrate 4K or HD signals), however, VPN solutions are not practical due to bandwidth limitations and/or costs. Such limitations will be exacerbated during health or other crises. Hence a more cost effective and practical remote monitoring solution is required.

There is also a need for providing an improved remote master control room monitoring scheme and system and apparatuses implementing the same that address at least some of the above-described drawbacks and shortcomings of the conventional technology in the art.

SUMMARY

It is an object of the present subject disclosure to provide an improved remote master control room monitoring scheme and system and apparatuses implementing the same that address at least some of the above-described drawbacks and shortcomings of the conventional technology in the art.

Another object of the present subject disclosure is to provide an improved scheme for monitoring video streams and apparatuses implementing the same for alleviating the above-described drawbacks and shortcomings of conventional video monitoring schemes, in particular with respect to video monitoring schemes from remote monitoring sites.

To achieve these objects and other advantages and in accordance with the purpose of the present subject disclosure, as embodied and broadly described herein, in one aspect of the present subject disclosure, a method for monitoring video streams is proposed, which comprises: generating, by one or more source encoders, encoded multimedia content signals based on the encoding of monitored video streams respectively corresponding to one or more monitoring points along a workflow chain of a video broadcasting headend configured for one or more video channels broadcasted by the headend, and transmitting the encoded multimedia content signals to a remote monitoring device through a content distribution network.

In one or more embodiments, the proposed method may further comprise: receiving, by a player comprised in the remote monitoring device, the encoded multimedia content signals; and displaying one or more of the received encoded multimedia content signals for monitoring the corresponding monitored video streams.

In one or more embodiments, the encoded multimedia content signals may be transmitted to the remote monitoring device using low latency chunk encoding and transfer mechanisms. In one or more embodiments, the player may also be configured to receive and display content that is transmitted using low latency chunk encoding and transfer mechanisms. The use of such mechanisms may advantageously further reduce the latency between reception of a video stream to be monitored, and display of a corresponding video at a remote video monitoring site.

In one or more embodiments, the monitored video contents may comprise live and/or curated video contents corresponding to television channels.

In one or more embodiments, one or more of the monitored video streams may be downscaled by one or more downscaling engines prior to being encoded to generate the encoded multimedia content signals. The encoded multimedia content signals may then comprise small-sized thumbnails generated from the downscaling, which may advantageously further reduce the bandwidth required to transmit the video contents to be monitored to a remote video monitoring site, as such may be based on the encoded thumbnails.

In one or more embodiments, the proposed method may further comprise: encryption and protection, through Digital Rights Management, DRM, of the transmitted signal.

In one or more embodiments, the proposed method may further comprise: receiving, by the remote monitoring device, a first user input for configuring the one or more source encoders; transmitting, by the remote monitoring device, to the one or more source encoders, source encoding configuration data based on the first user input; and configuring the one or more source encoders based on received source encoding configuration data.

In one or more embodiments, the proposed method may further comprise: receiving, by the remote monitoring device, a second user input for configuring the downscaling performed by the one or more source encoders; transmitting, by the remote monitoring device, to one or more downscaling engines, downscaling configuration data based on the second user input; configuring the one or more downscaling engines based on received downscaling configuration data.

In one or more embodiments, the proposed method may further comprise: multiplexing, by one or more video multiplexing engines, a plurality of downscaled monitored video streams prior to being encoded by the one or more source encoders into the encoded multimedia content signals.

In one or more embodiments, the proposed method may further comprise: upon detection of an issue on an impacted video channel broadcasted by the headend corresponding to an issue point of the workflow chain for the impacted video channel, generating an alarm signal based on the detected issue, and monitoring first and second video streams of the impacted video channel according to the method of any of the preceding claims, wherein the first video stream corresponds to a first monitoring point along the workflow chain before the issue point along the workflow chain, and the second video stream corresponds to a second monitoring point along the workflow chain after the issue point along the workflow chain.

In one or more embodiments, the proposed method may further comprise: upon detection of an issue on an impacted video channel broadcasted by the headend, generating an alarm signal based on the detected issue, and prioritizing the monitoring of the impacted video channel over other video channels broadcasted by the headend.

In one or more embodiments, the prioritizing the monitoring of the impacted video channel may comprise: halting the monitoring of one or more of other monitored video channels broadcasted by the headend, and/or continue the monitoring of the one or more of other monitored video channels broadcasted by the headend at respective lower bit-rates.

In one or more embodiments, the proposed method may further comprise: upon detection of an issue on an impacted video channel broadcasted by the headend, monitoring one or more video streams of the impacted video channels according to the method of any of the preceding claims, wherein a Group Of Picture, GOP, structure of a monitored video stream of the impacted video channel is modified to only include I video frames and/or P video frames.

In one or more embodiments, the proposed method may further comprise: upon detection of an issue on an impacted video channel broadcasted by the headend, monitoring one or more video streams of the impacted video channels according to the method of any of the preceding claims, wherein a chunking mechanism used for a monitored video stream of the impacted video channel is modified to include a single frame per chunk.

In another aspect of the present subject disclosure, a method for monitoring video streams is proposed, which comprises, at a remote monitoring device: receiving encoded multimedia content signals generated based on monitored video streams respectively corresponding to one or more monitoring points along a workflow chain of a video broadcasting headend configured for each of one or more video channels broadcasted by the headend; and displaying one or more of the received encoded multimedia content signals for monitoring the corresponding monitored video streams.

In yet another aspect of the present subject disclosure, a video stream monitoring system is proposed, which comprises a source encoder comprised in a video broadcasting headend, and a remote monitoring device, wherein: the source encoder comprises a source encoder processor and a source encoder memory operatively coupled to the source encoder processor, wherein the source encoder processor is configured for: generating encoded multimedia content signals based on the encoding of monitored video streams respectively corresponding to one or more monitoring points along a workflow chain of the video broadcasting headend configured for one or more video channels broadcasted by the headend; and transmitting the encoded multimedia content signals to the remote monitoring device through a content distribution network, and wherein the remote monitoring device comprises a remote monitoring device processor and a remote monitoring device memory operatively coupled to the remote monitoring device processor, wherein the remote monitoring device processor is configured for: receiving the encoded multimedia content signals; displaying one or more of the received encoded multimedia content signals for monitoring the corresponding monitored video streams.

In yet another aspect of the present subject disclosure, a video monitoring headend device may comprise a source encoder comprised in a video broadcasting headend, wherein the source encoder comprises a source encoder processor and a source encoder memory operatively coupled to the source encoder processor, wherein the source encoder processor is configured for: generating encoded multimedia content signals based on the encoding of monitored video streams respectively corresponding to one or more monitoring points along a workflow chain of the video broadcasting headend configured for one or more video channels broadcasted by the headend; and transmitting the encoded multimedia content signals to a remote monitoring device through a content distribution network.

In yet another aspect of the present subject disclosure, a remote video monitoring device comprising a remote monitoring device processor and a remote monitoring device memory operatively coupled to the remote monitoring device processor, wherein the remote monitoring device processor is configured for: receiving the encoded multimedia content signals; and displaying one or more of the received encoded multimedia content signals for monitoring the corresponding monitored video streams.

In another aspect of the present subject disclosure, an apparatus is proposed, which comprises a processor, and a memory operatively coupled to the processor, wherein the apparatus is configured to perform a method as proposed in the present subject disclosure.

In yet another aspect of the present subject disclosure, a non-transitory computer-readable medium encoded with executable instructions which, when executed, causes an apparatus comprising a processor operatively coupled with a memory, to perform a method as proposed in the present subject disclosure, is proposed.

For example, in embodiments, the present subject disclosure provides a non-transitory computer-readable medium encoded with executable instructions which, when executed, causes an apparatus comprising a processor operatively coupled with a memory, to perform a method for monitoring video streams as proposed, which comprises: generating, by one or more source encoders, encoded multimedia content signals based on the encoding of monitored video streams respectively corresponding to one or more monitoring points along a workflow chain of a video broadcasting headend configured for one or more video channels broadcasted by the headend, and transmitting the encoded multimedia content signals to a remote monitoring device through a content distribution network.

In yet another aspect of the present subject disclosure, a computer program product comprising computer program code tangibly embodied in a computer readable medium, said computer program code comprising instructions to, when provided to a computer system and executed, cause said computer to perform a method as proposed in the present subject disclosure, is proposed.

In another aspect of the present subject disclosure, a data set representing, for example through compression or encoding, a computer program as proposed herein, is proposed.

It should be appreciated that the embodiments described herein can be implemented and utilized in numerous ways, including without limitation as a process, an apparatus, a system, a device, and as a method for applications now known and later developed. These and other unique features of the system disclosed herein will become more readily apparent from the following description and the accompanying drawings.

BRIEF DESCRIPTION OF THE DRAWINGS

The described embodiments will be better understood and its numerous objects and advantages will become more apparent to those skilled in the art by reference to the following drawings, in conjunction with the accompanying specification, in which.

DETAILED DESCRIPTION

Figure 1:
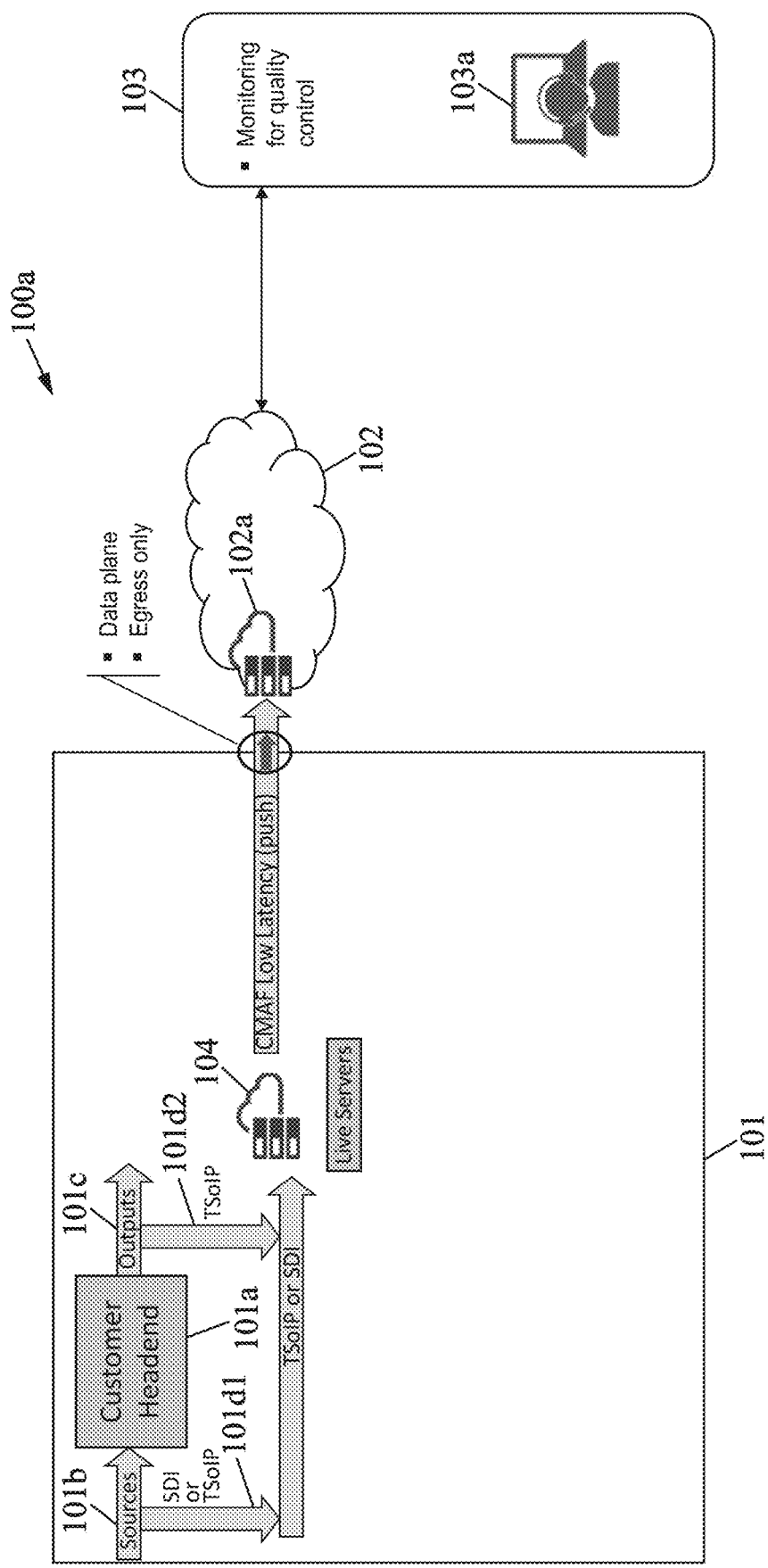
FIG. 1 is a block diagram illustrating an exemplary remote MCR monitoring system in accordance with one or more embodiments.

For simplicity and clarity of illustration, the drawing figures illustrate the general manner of construction, and descriptions and details of well-known features and techniques may be omitted to avoid unnecessarily obscuring the discussion of the described embodiments. Additionally, elements in the drawing figures are not necessarily drawn to scale. For example, the dimensions of some of the elements in the figures may be exaggerated relative to other elements to help improve understanding of the described embodiments. Certain figures may be shown in an idealized fashion in order to aid understanding, such as when structures are shown having straight lines, sharp angles, and/or parallel planes or the like that under real-world conditions would likely be significantly less symmetric and orderly. The same reference numerals in different figures denote the same elements, while similar reference numerals may, but do not necessarily, denote similar elements.

In addition, it should be apparent that the teaching herein can be embodied in a wide variety of forms and that any specific structure and/or function disclosed herein is merely representative. In particular, one skilled in the art will appreciate that an aspect disclosed herein can be implemented independently of any other aspects and that several aspects can be combined in various ways.

The present disclosure is described below with reference to functions, engines, block diagrams and flowchart illustrations of the methods, systems, and computer program according to one or more exemplary embodiments. Each described function, engine, block of the block diagrams and flowchart illustrations can be implemented in hardware, software, firmware, middleware, microcode, or any suitable combination thereof. If implemented in software, the functions, engines, blocks of the block diagrams and/or flowchart illustrations can be implemented by computer program instructions or software code, which may be stored or transmitted over a computer-readable medium, or loaded onto a general purpose computer, special purpose computer or other programmable data processing apparatus to produce a machine, such that the computer program instructions or software code which execute on the computer or other programmable data processing apparatus, create the means for implementing the functions described herein.

Embodiments of computer-readable media includes, but are not limited to, both computer storage media and communication media including any medium that facilitates transfer of a computer program from one place to another. As used herein, a "computer storage media" may be any physical media that can be accessed by a computer or a processor. In addition, the terms "memory" and "computer storage media" include any type of data storage device, such as, without limitation, a hard drive, a flash drive or other flash memory devices (e.g. memory keys, memory sticks, key drive), CD-ROMs or other optical data storage devices, DVDs, magnetic disk data storage devices or other magnetic data storage devices, data memory components, RAM, ROM and EEPROM memories, memory cards (smart cards), solid state drive (SSD) memories, and any other form of medium able to be used to transport or store or memorize data or data structures able to be read by a computer processor, or a combination thereof. Furthermore, various forms of computer-readable media may transmit or carry instructions to a computer, such as a router, a gateway, a server, or any data transmission equipment, whether this involves wired transmission (via coaxial cable, optical fibre, telephone wires, DSL cable or Ethernet cable), wireless transmission (via infrared, radio, cellular, microwaves) or virtualized transmission equipment (virtual router, virtual gateway, virtual tunnel end, virtual firewall). According to the embodiments, the instructions may comprise code in any computer programming language or computer program element, such as, without limitation, the languages of assembler, C, C++, Visual Basic, HyperText Markup Language (HTML), Extensible Markup Language (XML), HyperText Transfer Protocol (HTTP), Hypertext Preprocessor (PHP), SQL, MySQL, Java, JavaScript, JavaScript Object Notation (JSON), Python, and bash scripting.

Unless specifically stated otherwise, it will be appreciated that throughout the following description discussions utilizing terms such as processing, computing, calculating, determining, or the like, refer to the action or processes of a computer or computing system, or similar electronic computing device, that manipulate or transform data represented as physical, such as electronic, quantities within the registers or memories of the computing system into other data similarly represented as physical quantities within the memories, registers or other such information storage, transmission or display devices of the computing system.

The terms "comprise," "include," "have," and any variations thereof, are intended to cover a non-exclusive inclusion, such that a process, method, article, or apparatus that comprises a list of elements is not necessarily limited to those elements, but may include other elements not expressly listed or inherent to such process, method, article, or apparatus.

Additionally, the word "exemplary" is used herein to mean "serving as an example, instance, or illustration". Any embodiment or design described herein as "exemplary" is not necessarily to be construed as preferred or advantageous over other embodiments or designs. The terms "in particular", "for example", "example", "typically" are used in the present description to denote examples or illustrations of non-limiting embodiments that do not necessarily correspond to preferred or advantageous embodiments with respect to other possible aspects or embodiments.

The terms "operationally coupled", "coupled", "mounted", "connected" and their various variants and forms used in the present description refer to couplings, connections and mountings that may be direct or indirect, and comprise in particular connections between electronic equipment or between portions of such equipment that allow operations and modes of operation as described in the present description. In addition, the terms "connected" and "coupled" are not limited to physical or mechanical connections or couplings. For example, an operational coupling may include one or more wired connection(s) and/or one or more wireless connection(s) between two or more items of equipment that allow simplex and/or duplex communication links between the equipment or portions of the equipment. According to another example, an operational coupling or a connection may include a wired-link and/or wireless coupling for allowing data communications between a server of the proposed system and another item of equipment of the system.

"Server" or "platform" in the present subject disclosure means any (virtualized or non-virtualized) point of service or computer device or system performing data processing operations, one or more databases, and/or data communication functions. For example, and without limitation, the term "server" or the term "platform" may refer to a physical processor operationally coupled to associated communication, database and data storage functions, or refer to a network, a group, a set or a complex of processors and associated data storage and networking equipment, and to an operating system and one or more database system(s) and application software supporting the services and functions provided by the server. A server or platform may be configured to operate in or as part of a cloud computing environment. A computer device or system may be configured so as to send and receive signals, via wireless and/or wired transmission networks(s), or be configured so as to process and/or store data or signals, and may therefore operate as a server. Equipment configured so as to operate as a server may thus include, by way of non-limiting example, dedicated servers mounted on a rack, cloud-based servers, desktop computers, laptop computers, service gateways (sometimes called "box" or "home gateway"), multimedia decoders (sometimes called "set-top boxes"), integrated equipment combining various functionalities, such as two or more of the abovementioned functionalities. The servers may vary greatly in terms of their configuration or their capabilities, but a server will generally include one or more central processing unit(s) and a memory. A server may also include one or more item(s) of mass memory equipment, one or more electric power supply/supplies, one or more wireless and/or wired network interface(s), one or more input/output interface(s), one or more operating system(s), such as Windows Server, Mac OS X, Unix, Linux, FreeBSD, or an equivalent.

The terms "application" or "application program" (AP) and their variants ("app", "web app", etc.) as used in the present description correspond to any tool that operates and is operated by way of a computer in order to provide or execute one or more function(s) or task(s) for a user or another application program. In order to interact with an application program and control it, a user interface may be provided on the equipment on which the application program is implemented. For example, a graphical user interface (or GUI) may be generated and displayed on a screen of the user equipment, or an audio user interface may be played back to the user using a speaker, a headset or an audio output.

The term "multimedia content" as used in the present description corresponds to any audio and/or video or audio-visual content, with or without closed captions, open captions, subtitles, timed text or visual descriptors.

In the present description, the terms "real-time" distribution, distribution "in linear mode", distribution "in linear TV mode", distribution "in dynamic mode" and "live" distribution or distribution "in live mode" are used interchangeably to denote the distribution in live mode or dynamic mode of multimedia content in a content distribution system to terminals, comprising in particular the distribution of the content as it is generated, as opposed to distributing content generated previously, upon an access request from a user (distribution upon an access request or "static" distribution or distribution in static mode), such as for example content recorded on a server and made available to users by a video on demand (VOD) service.

In the present description, the terms "real-time" are also used in the context of video encoding or compressing video content, to denote the encoding or compression of video content at least at the same speed, for example expressed in frames per second, as it is generated by one or more video content sources. For instance, if content is generated at 50 frames per second (fps) it will be deemed encoded in real-time as long as it is also encoded at at least 50 fps.

In the present description, the term "live content" refers to content, for example multimedia content, that is distributed, for example using an OTT distribution mode, in dynamic mode (as opposed to the static distribution mode). Live content will typically be generated by a television station, or by any type of television medium, and may also be distributed on a multimedia content broadcast network, in addition to being made available on content servers in an OTT distribution system.

In the present description, the terms "terminal", "user equipment", "reader", "reading device", "reading terminal" and "video reader" are used interchangeably to denote any type of device, implemented by one or more items of software, one or more items of hardware, or a combination or one or more items of software and one or more items of hardware, configured so as to use multimedia content distributed in accordance with a distribution protocol, for example a multi-screen distribution protocol, in particular by loading and by reading the content. The terms "client" and "video-reading client" are also used interchangeably to denote any type of device, software and/or hardware, or any function or set of functions, implemented by software and/or hardware within a device and configured so as to use multimedia content distributed in accordance with a distribution protocol, for example a multi-screen distribution protocol, in particular by loading the content from a server and by reading the content.

The terms "network" and "communication network" as used in the present description refer to one or more data links that may couple or connect possibly virtualized equipment so as to allow electronic data to be transported between computer systems and/or modules and/or other devices or electronic equipment, such as between a server and a client device or other types of devices, including between wireless devices that are coupled or connected via a wireless network, for example. A network may also include a mass memory for storing data, such as a NAS (network attached storage), a SAN (storage area network) or any other form of computer-readable or machine-readable medium, for example. A network may comprise, in full or in part, the Internet, one or more local area networks (LAN), one or more wide area networks (WAN), wired connections, wireless connections, cellular connections or any combination of these various networks. Similarly, subnetworks may use various architectures or conform with or be compatible with various protocols, and interoperate with larger networks. Various types of equipment may be used to make various architectures or various protocols interoperable. For example, a router may be used to provide a communication link or a data link between two LANs that would otherwise be separate and independent.

The methods proposed in the present subject disclosure may be implemented by any video source encoder, video source decoder, or video codec configured for encoding and/or decoding images (or frames) of input video data, such as, for example a video encoder and/or decoder compliant with any of the H.261, MPEG-1 Part 2, H.262, MPEG-2 Part 2, Alliance for Open Media (AOM) AV1, H.264/AVC, H.265/HEVC, MPEG-4 Part 2, and SHVC (Scalable HEVC) specifications or standards, whether in their existing versions and/or their evolutions, as the case may be adapted for implementing one or more embodiments of the proposed methods.

FIG. 1 shows an exemplary remote MCR monitoring system according to one or more embodiments of the subject disclosure.

Shown on FIG. 1 is a system 100a comprising a master control room 101 adapted for implementing one or more embodiments of the proposed method connected to a data communication network 102 to which a remote monitoring computing system 103 is connected. The remote monitoring computing system 103 is also adapted for implementing the one or more embodiments of the proposed method.

The master control room 101 may typically comprise a headend sub-system 101a to which video sources 101b are input, and which outputs video streams 101c to end customers. The video sources 101a may include various audio and/or video content, for example generated by a news studio or a movie studio, and metadata corresponding to content, for example representing closed captions, subtitles, etc.

The exemplary master control room (MCR) 101 illustrated on FIG. 1 comprises two monitoring points 101d1 and 101d2, that is, points along the headend workflow at which a video stream is probed for monitoring purposes. A first monitoring point 101d1 is configured to monitor video content of the video sources 101b, while a second monitoring point 101d2 is configured to monitor video content of the video outputs 101c. On premises, monitoring will typically be configured at multiple points along the headend workflow to be able to localize or identify the point at which any issues, such as disruptions and/or quality issues, occur.

Even though the following focuses on a non-limiting example wherein two monitoring points 101d1 and 101d2 are configured, a person of ordinary skill in the art would understand that the proposed processes, apparatuses and computer programs of the present subject disclosure may be implemented for a different number of monitoring points configured at various points along the headend workflow, and that such proposed processes, apparatuses and computer programs of the present subject disclosure are not limited to the use of any specific number or configuration of monitoring points, and in particular to the system of FIG. 1 with the two monitoring points 101d1 and 101d2, which are provided as an example only.

Content may be uncompressed or very lightly compressed along some of the links in the headend workflow. For example, the monitoring point 101d1 is configured to monitor uncompressed video content corresponding to video sources 101b, which may be transported using a data communication link suitable for carrying raw video content, such as an SDI link, a TSoIP link or a HDMI link. As illustrated in FIG. 1, uncompressed content can be monitored at the MCR premises, that is, viewed by a monitoring user, using SDI links. A person of ordinary skill in the art would understand that any type of link suitable for transporting uncompressed or very lightly compressed video content may be used in place of the SDI or TSoIP links of FIG. 1, which are provided as an example only.

Video content captured through the monitoring point 101d2, which is located at the end of the headend workflow, may be transported using a data communication link suitable for carrying compressed video content, such as for example a TSoIP link as illustrated on FIG. 1.

As illustrated on FIG. 1, in one or more embodiments the MCR 101 comprises one or more monitoring servers 104 ("Live Servers" on FIG. 1) typically provided at the premises where the MCR 101 is physically located, which may comprise one or more encoding and/or transcoding engines, also referred to in the following as source encoders. These one or more servers 104 are preferably configured for encoding content (such as video content and/or audio content) at each monitoring point along the head-end workflow in real-time. In other embodiments the servers 104 may be configured for encoding in real-time different type of content (for example different types of video content) at corresponding monitoring points along the head-end workflow.

In one or more embodiments, the data communication network 102 may be a Content Distribution Network or a Content Delivery Network (CDN). Advantageously, the monitoring servers 104 may be configured to continuously upload encoded content to a server 102a interfacing the MCR 101 with the CDN 102. The MCR 101 may therefore be provided in some embodiments with an interface with a server 102a (for example an origin server) of a CDN 102 for outputting to the server 102a compressed content, for example in push mode, that is, as it is generated by the one or more monitoring servers 104 of the MCR 101.

In one or more embodiments, the data communication between the monitoring servers 104 and the CDN 102 through the origin server 102a may use a low latency data communication mechanism, such as for example provided by the CMAF (Control Media Application Format) data communication mechanism, as illustrated on FIG. 1. The CMAF mechanism provides a container format and a specific means for formatting and packaging audio/video content which allows transmission of audio/video content with low latency between the time content to be monitored is received at the monitoring point and the time such content is displayed at a remote monitoring computer device 103a to a user/technician. Content formatted according to the CMAF may advantageously be transferred over IP-based communication network and IP-based communication links. Low latency is achieved because CMAF formatted content can be transferred in smaller chunks (atomic units) as compared to other, traditional formats. As an example, the streaming latency for encoding, distributing, decoding and displaying video content is typically in the order of 30 seconds or more. When using the proposed low latency data communication mechanisms (such as CMAF), a reduced latency for encoding, distributing, decoding and displaying video content of approximately 3-5 seconds may be achieved. A person of ordinary skill in the art would understand that other suitable formats providing low-latency data communication of video content, such as Low Latency HTTP Live Streaming (LL HLS), in its current or future versions, may be used in place or as a complement of CMAF, in its current or future versions, which is given only as an example.

In order to further reduce the latency between the time content to be monitored is received at the monitoring point (that is, prior to its encoding) and the time at which the content is displayed to the technician in a remote monitoring site, the data communication link between the MCR 101 and the CDN 102 may be chosen to be high bitrate.

The server 102a of the CDN 102 may be configured for receiving data outputted by the monitoring servers 104 and formatted using the CMAF low latency data communication mechanism.

As mentioned above, a "push"-type data communication mechanism may also be used between the monitoring servers 104 and the CDN 102, so as to further reduce the latency. Indeed, each of the monitoring servers 104 knows when content (e.g. depending on the embodiment, segments, or chunks as discussed below) have been encoded. Therefore encoded content may be pushed towards the interface between the relevant encoding server and the CDN 102 as soon as it is encoded, that is, without waiting for a request for data generated by the server 102a. In this case, data communication is guided by the live server(s) 104 instead of the origin server 102a as illustrated on FIG. 1.

Alternatively, a "pull"-type data communication mechanism may be used, according to which the server 102a may request data from the encoders 104 as it is ready to transfer such data through the CDN 102. In this case, data communication would be guided by the origin server 102a instead of the live server(s) 104.

The server 102a may be an origin server which interfaces with the CDN network 102, and is configured for data communication between the monitoring servers 104 and the CDN network 102. Depending on the embodiment, the origin server 102a may or may not reside in the MCR premises. As illustrated on FIG. 1, the server 102a may be configured as a streaming server, for low latency delivery of streaming video content to a computer system 103a located in a remote monitoring site 103 and configured with a remote monitoring application, such as for example a remote monitoring client software. Alternatively, the server 102a may be configured for data communication with one or more streaming servers of the CDN network 102.

At the remote monitoring site 103, a user (e.g. a technician) may monitor on the computer system 103a video content that may correspond to one or more of the monitoring points 101d1 and 101d2 configured at the MCR 101.

A person of ordinary skill in the art would understand that any type of network suitable for providing fast delivery of Internet content, such as video content, may be used in place of the CDN 102 of FIG. 1, which is provided as an example only, and that any format suitable for transmission of content, such as video content, with very low latency, may be used in place of the CMAF format of FIG. 1, which is provided as an example only. Using a CDN advantageously allows leveraging the existing CDN infrastructure, whether public or private, for data communication between the monitoring servers 104 of the MCR 101 and the computer system 103a of the user at the remote monitoring site 103.

Advantageously, according to the present subject disclosure, the monitoring servers 104 and the video streams they deliver are completely separate from the actual live distribution of the channels, so that they do not impact their operation.

In one or more embodiments, uncompressed and/or lightly compressed content may be encoded using advanced video compression standards (such as, but not limited to, HEVC, AV1 or VVC, or typically any video compression scheme which performs a bitrate compression by a factor of 100 or more as compared to a SDI bitrate) to minimize bandwidth requirements while maintaining a high quality for the video. Similarly, audio content, such as corresponding to audio accompanying the video content, may be compressed using advanced audio codecs such as, but not limited to, HE-AAC or AC-4. To protect the content from unauthorized usage, content protection schemes (such as encryption) may in some embodiments be applied prior to uploading to the server 102a of the CDN network 102 to which the content is outputted by the monitoring servers 104.

At the remote monitoring site 103—such as a satellite office or a home office—a technician may use in one or more embodiments a low latency streaming enabled player (such as dash.js) to receive and monitor the data streams received from CDN network 102.

In one or more embodiments, a remote monitoring Management System (MS) 103a is proposed to implement aspects of the proposed methods related to the remote monitoring site. The remote monitoring MS 103a may be configured with various user interfaces, including a Graphical User Interface (GUI) and a dashboard to enable the technician to pick and choose which stream or streams to monitor (e.g. monitor point 2 of channel 5, or a mosaic of all monitoring points for channel 7).

Figure 2A:
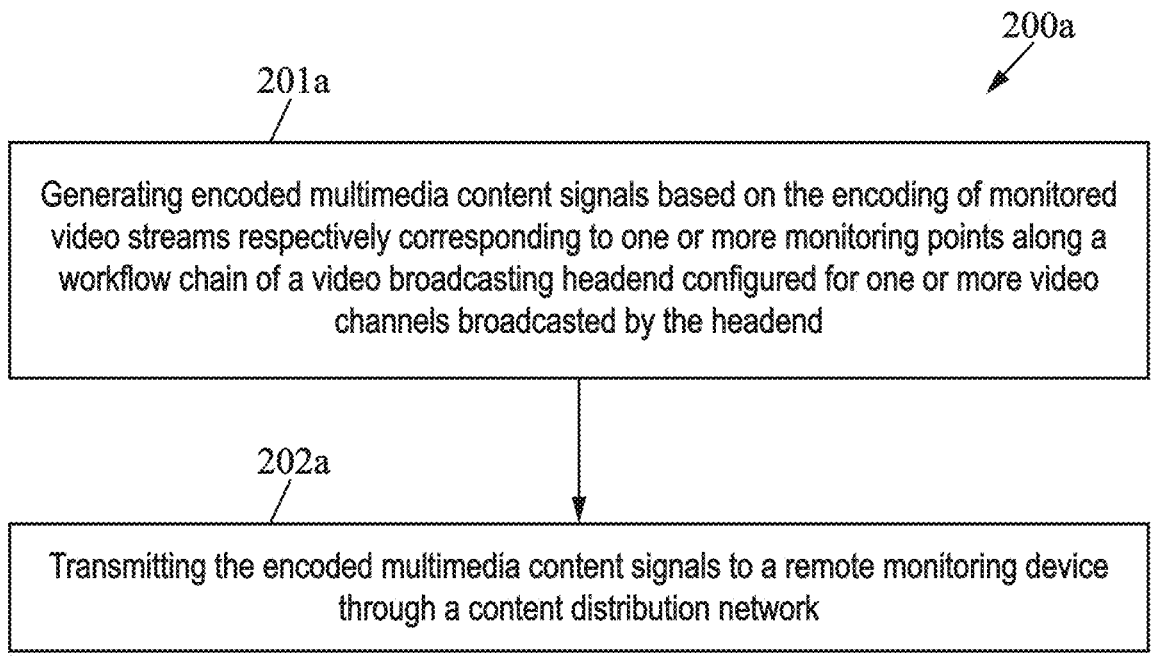
FIGS. 2a and 2b illustrate exemplary methods for monitoring video streams in accordance with one or more embodiments.
Figure 2B:
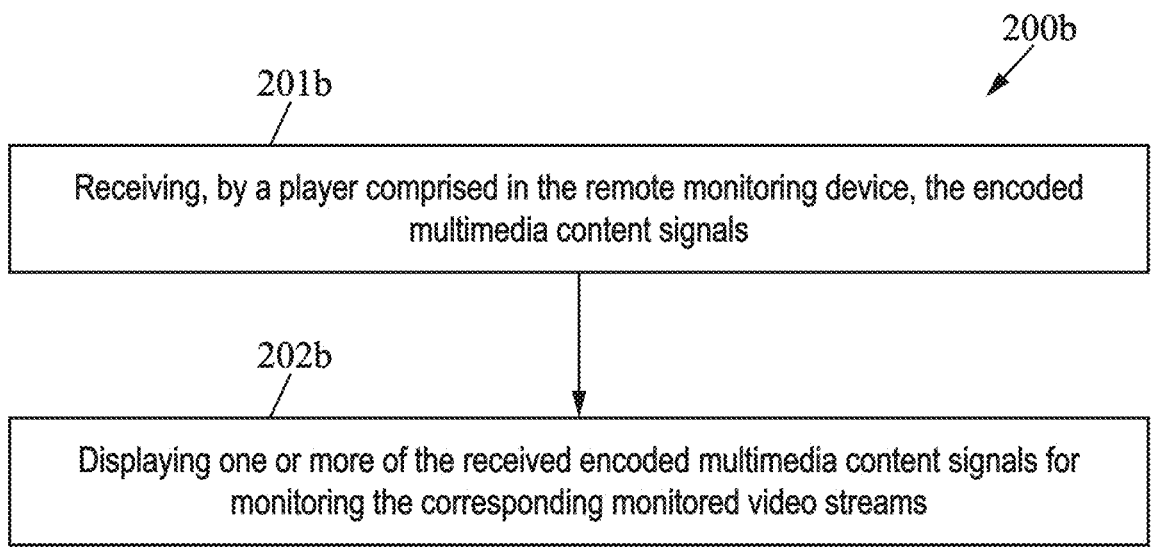

FIGS. 2a and 2b illustrate exemplary methods for monitoring video streams according to one or more embodiments of the present subject disclosure. FIG. 2a illustrates operations 200a that may preferably be carried out at a master control room site or at any multimedia content distribution site where monitoring points may need to be setup, such as for example the MCR 101 illustrated on FIG. 1, whereas FIG. 2b illustrates operations 200b that may preferably be carried out at a remote monitoring site, that is, a site distinct from the site in which monitoring points are setup, such as for example the remote monitoring site 103 illustrated on FIG. 1.

As shown on FIG. 2a, in some embodiments, encoded multimedia content signals may be generated 201a by one or more encoders, based on the encoding of monitored video streams. Preferably, the monitored video streams may respectively correspond to one or more monitoring points along a workflow chain of a video broadcasting headend which are configured for one or more video channels broadcasted by the headend. The video channels may typically correspond to TV channels broadcasted using one or more of various TV broadcast technologies (such as over the air, satellite, cable and over the top broadcasting technologies). Depending on the embodiment, the video encoding may be configured, for example dimensioned, based on the number of TV channels to be monitored and/or the number of monitoring points to be configured for each monitored TV channels.

The encoded multimedia content may then be transmitted 202a to a remote monitoring device, for example through a content distribution network, such as the CDN network 102 illustrated on FIG. 1. Preferably, the remote monitoring device configured for remote (for example, home) monitoring of video streams.

As shown on FIG. 2b, for example at a remote monitoring site comprising the remote monitoring device, the encoded multimedia content may be received 201b by a player comprised in the remote monitoring device.

One or more of the received encoded multimedia content signals may then be displayed 202b for monitoring, by a technician, the corresponding monitored video streams.

In one or more embodiments, the encoded multimedia content signals may advantageously be transmitted to the remote monitoring device using low-latency chunk encoding and transfer techniques. Indeed in video encoding, more particularly for video streaming usage, a video sequence to be transmitted may be encoded by segmenting the video sequence, that is, dividing the video sequence into segments, prior to encoding. The use of segment-based transfer in current systems takes into account constraints that are intended to ensure that the change in profile from one level of quality to another does not have a visual impact that could be inconvenient to a user. A video sequence comprising a set of images may thus be divided into consecutive segments, each segment corresponding to a subset of the set of images, in particular when the video sequence is distributed in encoded form in dynamic (live) mode or in static mode (for example in on-demand distribution mode). The segments of the sequence may be encoded sequentially, for example as they are distributed. Each segment that is transmitted, for example during video streaming, thus represents an encoded part of the video sequence or of the initial video stream for a given quality, and can be decoded independently of other segments of the video sequence. The phase of encoding the segments prior to transmission aims to compress the data of the video sequence in order to limit the resources required to transmit it and/or to store it. This encoding phase also makes it possible to obtain a plurality of lower and higher quality/resolution profiles in one and the same video sequence. These profiles of the video sequence are then transmitted via the segments, which makes it possible to adapt the quality of the video sequence to the constraints of the client (bitrate, hardware resources of the viewing apparatus, etc.). Therefore segments may be used as switching boundaries between bandwidths.

Therefore, using segments allows a player device to start reading a video sequence even though the video sequence has not been completely downloaded, but also to switch to a different profile having a lower or higher quality, depending on the fluctuations in bandwidth experienced by the player device during reception of the video stream.

In the field of video streaming, segments may be further divided into a sequence of subsets, usually called chunks, for example according to a low latency transport format such as CMAF. Various video stream transport protocols, such as HLS (HTTP Live Streaming) or DASH (Dynamic Adaptive Streaming over HTTP), use stream segmentation. The use of segments divided into low latency chunks has been introduced more recently for these video stream transport protocols, for example through the introduction of CMAF for DASH, and the specification of Low Latency HLS (LL-HLS).

Each segment may include a plurality of chunks, where each chunk can be encoded and transmitted separately. In contrast to the segments, however with the exception of the first chunk in each segment which is independently decodable, chunks belonging to the same segment are dependent on each other for decoding. For example, 2-second long CMAF segments may each be divided into four 500-ms long chunks. The first chunk of each segment may be independently decodable, while the remaining chunks within the same segment may not. Because the chunks are much smaller than the segments, the chunks may be transmitted much faster than the segments.

Therefore the proposed methods may in some embodiments advantageously use available segmented stream encoding and transfer schemes, and preferably schemes using low latency chunks on segmented streams, even though applied to video streams that are not broadcasted to end user, to facilitate and improve the monitoring capacities of a technician in a remote monitoring site (typically a technician who is not working in the MCR, but in a different facility—for example a corporate monitoring site other than the MCR or working from home). In embodiments where the encoded multimedia content signals are transmitted to the remote monitoring device using low-latency chunk encoding and transfer techniques, the player may be advantageously configured to receive and decode content that is transmitted using low latency chunk encoding and transfer techniques.

Any suitable segmentation-based encoding and/or decoding technique, such as for example specified for coding standards, such as H.264/AVC, H.265/HEVC and MPEG-2, may be used according to embodiments of the present subject disclosure.

In a typical MCR, a single technician is responsible for monitoring several channels. Given that each channel is monitored at multiple monitoring points, the technician would need to have access to a potentially large number of streams. For instance, if the technician needs to monitor 8 channels, and each channel has 4 monitoring points, that adds up to 32 streams. Even using efficient encoders in the above-mentioned monitoring servers 104, these many streams may still overwhelm the technician's home office connection.

Figure 3:
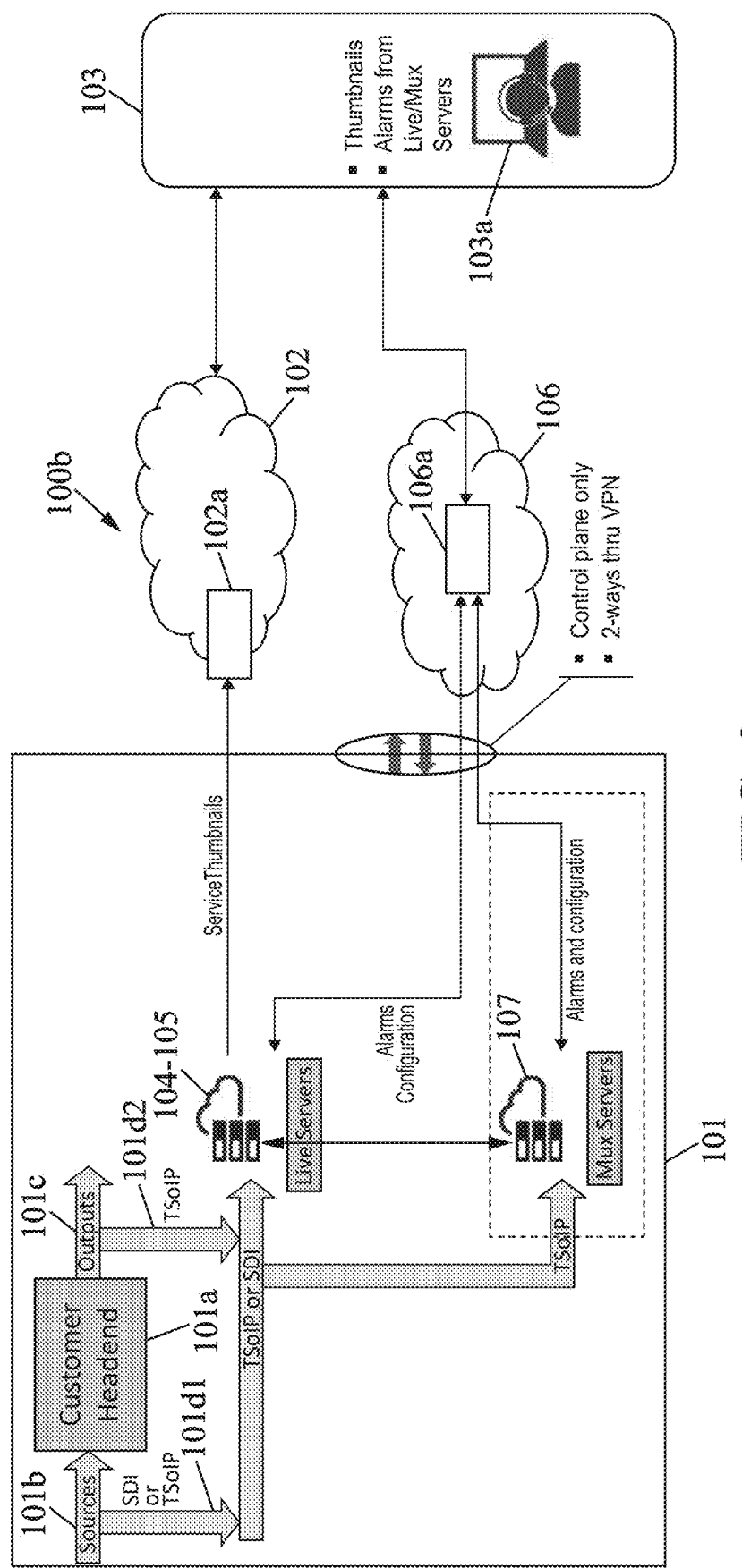
FIG. 3 is a block diagram illustrating an exemplary remote MCR monitoring system in accordance with one or more embodiments.

FIG. 3 illustrates other aspects of an exemplary remote MCR monitoring system according to one or more embodiments of the subject disclosure for enabling simultaneous monitoring of multiple streams.

Shown on FIG. 3 is a system 100b similar to the system 100a of FIG. 1 in that it also comprises a master control room 101 adapted for implementing one or more embodiments of the proposed method connected to a data communication network 106 to which a remote monitoring computing system 103a at a remote monitoring site 103 is connected. The remote monitoring computing system 103a is also adapted for implementing the one or more embodiments of the proposed method.

The master control room 101 may typically comprise a headend sub-system 101a to which video sources 101b are input, and which outputs video streams 101c to end customers. The video sources 101a may include various audio and/or video content, for example generated by a news studio or a movie studio, and metadata corresponding to content, for example representing close captions, subtitles, etc.

The exemplary master control room (MCR) 101 illustrated on FIG. 3 also comprises two exemplary monitoring points 101d1 and 101d2, that is, points along the headend workflow at which a video stream is probed for monitoring purposes. A first monitoring point 101d1 is configured to monitor video content of the video sources 101b, while a second monitoring point 101d2 is configured to monitor video content of the video outputs 101c. On premises, monitoring will typically be configured at multiple points along the headend workflow to be able to localize or identify the point at which any issues, such as disruptions and/or quality issues, occur.

Even though the following focuses on a non-limiting example wherein two monitoring points 101d1 and 101d2 are configured, a person of ordinary skill in the art would understand that the proposed processes, apparatuses and computer programs of the present subject disclosure may be implemented for a different number of monitoring points configured at various points along the headend workflow, and that such proposed processes, apparatuses and computer programs of the present subject disclosure are not limited to the use of any specific number or configuration of monitoring points, and in particular to the system of FIG. 1 with the two monitoring points 101d1 and 101d2, which are provided as an example only.

In the one or more embodiments of the proposed methods illustrated on FIG. 3, one or more of the monitored streams are downscaled by a downscaling engine 105, also referred to as a thumbnail generation engine 105 in the following (which, depending on the embodiment, may be hosted in head-end transcoders or may be implemented in the monitoring servers 104 of FIG. 1) to much lower resolution thumbnails, instead of being transmitted at full resolution video. These thumbnails may then be encoded at much lower bitrates prior to transmission to the remote monitoring computer system 103a at the remote site 103. Depending on the embodiment, the thumbnails may be generated by the thumbnail generation engine 105 which may be implemented separately from the encoding server(s) 104 illustrated on FIG. 1, or as an engine in one or more of such encoding server(s) 104.

Therefore, in one or more embodiments one or more of the monitored video streams are downscaled by the one or more encoders prior to being encoded to generate the encoded multimedia content signals transmitted to the remote monitoring computer system at the remote monitoring site. The transmission of encoded thumbnails to a remote monitoring system 103a located in a remote monitoring site 103 may use the same data communication mechanisms, protocols and equipment as described above with respect to transferring encoded content with low latency mechanisms to a remote monitoring computer system and illustrated on FIG. 1.

The generation of thumbnails based on downscaling the monitored video streams advantageously significantly reduces the bitrate required for transmission of streams to be monitored to a remote monitoring site, such as the home of a technician. Indeed, while the downscaling process causes loss of detail and overall quality, the thumbnails are still good enough to detect major problems such as loss of signal, pixelation, loss of sound or poor lip synch, etc., that is, to monitor at a remote site the monitored video streams.

As illustrated on FIG. 3, in one or more embodiments, a VPN established between the MCR 101 and the remote monitoring computer system 103a may advantageously be used to transmit configuration commands from the remote monitoring computer system 103a to the one or more engines implementing the proposed method of the present subject disclosure for configuration thereof, in particular to transmit configuration commands to the thumbnail generation engine to configure the generation of the service thumbnails.

Figure 4:
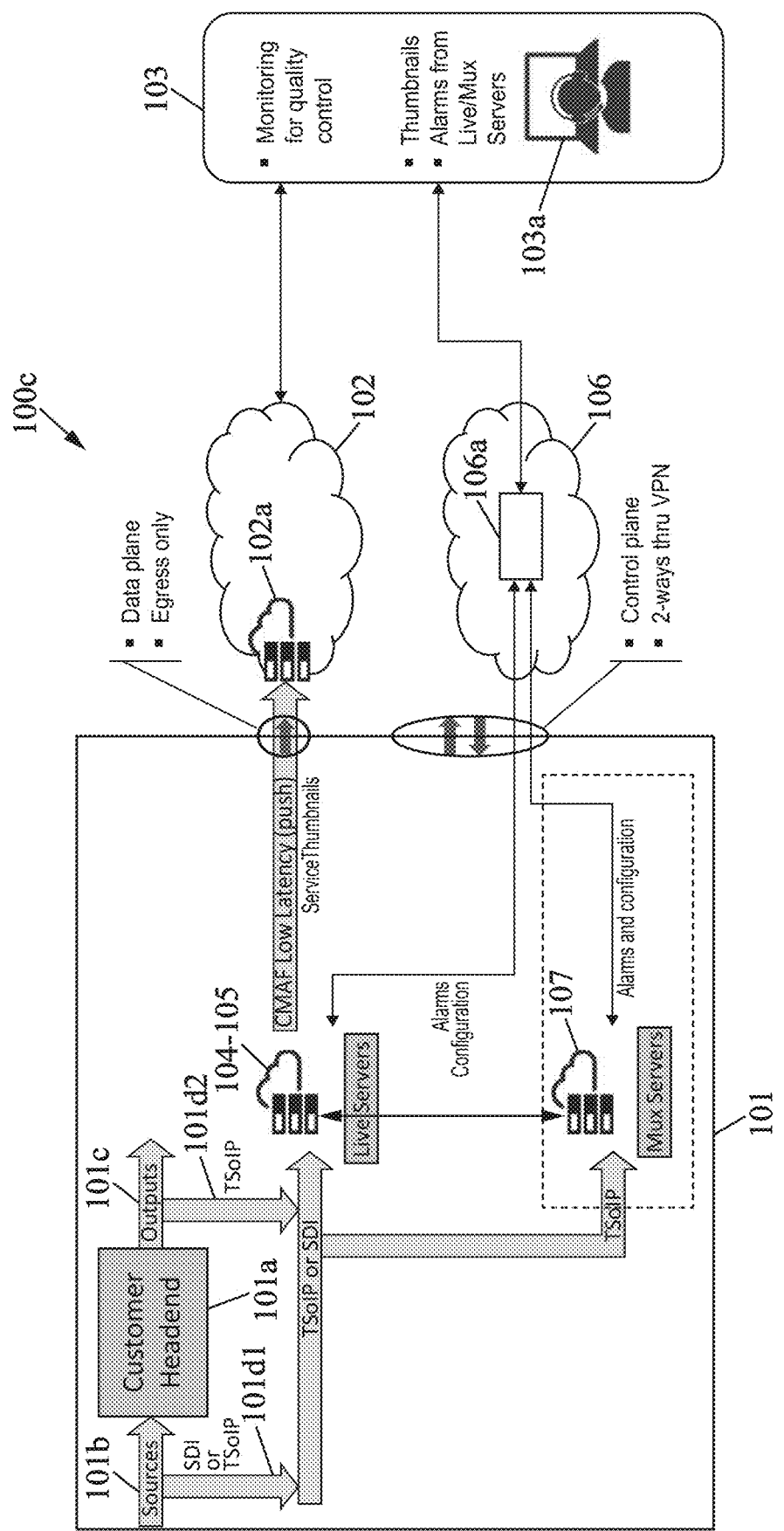
FIG. 4 is a block diagram illustrating an exemplary remote MCR monitoring system in accordance with one or more embodiments.

In one or more embodiments, control data may be exchanged between one or more servers located in the MCR 101 and configured for implementing the proposed method, such as the servers 104 illustrated on FIG. 1 and the servers 104-105, and/or 107 illustrated on FIGS. 3 and 4, and remote monitoring computer system 103a located in a remote monitoring site 103, through a data communication network 106.

In one or more embodiments, the exchange of control data may be performed using one or more control and management servers 106a configured for implementing control and management (including service configuration and alarm management) functions associated with the monitoring of video content, and in particular the remote monitoring according to a proposed methods. For example, a control and management server 106a may be configured to provide access control, en masse configuration of encoders, consolidation of alarms and logs, automatic detection of failures and recovery, specifying redundancy, etc.

In one or more embodiments, a Virtual Private Network (VPN) may be used for the exchange of control data, between the servers 104-105 and/or 107 of the MCR 101 and the control and management server 106a, and/or between the control and management server 106a and the remote monitoring computer system 103a.

For example, in some embodiments of the proposed method, a user (e.g. a technician) of a remote monitoring computer system or device may input a command for configuring the encoding of one or more of the video streams to be remotely monitored. The remote monitoring device may receive a first user input for configuring one or more source encoders used at the MCR for encoding video streams to be remotely monitored. The remote monitoring device may be configured for, upon receiving the first user input, generating source encoding configuration data based on the first user input, and transmitting to one or more source encoders at the MCR the source encoding configuration data. The one or more source encoders may in turn be configured for receiving the source encoding configuration data and for updating their configuration with respect to encoding based on received source encoding configuration data.

As another example, in some embodiments, the technician at the remote site 103 may have the ability to remotely configure the generation of the thumbnails (including various parameters, such as for example resolutions and bitrates) via a two-way control plane using a VPN as shown in FIG. 3. For example, in some embodiments of the proposed method, a user (e.g. a technician) of a remote monitoring computer system or device may input a command for configuring the downscaling of one or more of the video streams to be remotely monitored. The remote monitoring device may receive a second user input for configuring one or more source encoders used at the MCR for downscaling video streams to be remotely monitored. The remote monitoring device may be configured for, upon receiving the second user input, generating downscaling configuration data based on the second user input, and transmitting to one or more source encoders at the MCR the downscaling configuration data. The one or more source encoders may in turn be configured for receiving the source encoding configuration data and for updating their configuration with respect to downscaling based on received downscaling configuration data.

In one or more embodiments, the control and management functions described in the present subject disclosure, in particular in connection with the examples illustrated on FIGS. 3 and 4, such as the alarm and/or configuration functions described in the present subject disclosure, may be implemented and used with a remote monitoring system and method such as described in connection with the example of FIG. 1.

Through these one or more remote configuration capabilities, the monitoring of video streams may therefore advantageously be further expanded to enable a richer control monitoring interface for remote monitoring streams in a transparent manner from a remote site, that is as if the technician was on-site (for example at the MCR).

In one or more embodiments, a VPN established between the MCR 101 and the remote monitoring computer system 103 may advantageously be used to receive at the remote monitoring computer system 103a high-priority and low bitrate alerts and alarms through this connection.

In one or more embodiments, a plurality of downscaled monitored video streams may be multiplexed to form a single mosaic stream prior to being encoded into the encoded multimedia content signals, thereby advantageously providing a more efficient transmission to the remote monitoring site 103. The mosaic stream may be generated according to the following acts: a) a plurality of video streams are downscaled, b) the downscaled streams are stitched together to form a single mosaic video, c) the mosaic is then encoded as if it were one single large resolution video.

Therefore, depending on the embodiment, thumbnails streams may be distributed independently or multiplexed.

The multiplexing of thumbnail streams into one or more mosaic streams may be performed as illustrated on FIG. 3 by a multiplexing engine 107, possibly embedded in one or more servers ("Mux Servers" on FIGS. 3 and 4). The multiplexing engine 107 may be configured to receive a plurality of thumbnails, generated by downscaling corresponding uncompressed video streams, for example at the Live Servers 104-105, through a data communication link between the Live Servers 104-105 and the multiplexing engine 107. The multiplexing engine 107 may further be configured to generate one or more mosaic streams based on the received data. A plurality of thumbnails may then be multiplexed into one or more mosaic streams, which are then provided to the monitoring servers 104 for encoding prior to transmission to the remote monitoring device 103a.

Likewise the source encoding and downscaling operations discussed above, the multiplexing of thumbnail streams may be remotely configured in some embodiments by a technician based on a user interface provided on the remote monitoring device 103a. For example, in some embodiments of the proposed method, a user (e.g. a technician) of a remote monitoring computer system or device may input a command for configuring the multiplexing of one or more thumbnails generated based on video streams to be monitored. The remote monitoring device may receive a third user input for configuring one or more multiplexing engines used at the MCR for multiplexing one or more thumbnails. The remote monitoring device may be configured for, upon receiving the third user input, generating multiplexing configuration data based on the third user input, and transmitting to one or more multiplexing engines at the MCR the multiplexing configuration data. The one or more multiplexing engines may in turn be configured for receiving the multiplexing configuration data and for updating their configuration with respect to multiplexing thumbnails based on received multiplexing configuration data.

Depending on the embodiment, the system 100a of FIG. 1 and the system 100b of FIG. 3 may be used independently from each other, in that the encoding may be performed on thumbnail streams instead of uncompressed streams with no downscaling. That is, the proposed remote monitoring method according to embodiments illustrated with the system 100a of FIG. 1 may be used independently from the proposed remote monitoring method according to embodiments illustrated with the system 100b of FIG. 3. For example, the system depicted in FIG. 3 can be used independently of the components shown in FIG. 1, especially when the remote technician has an Internet connection with a relatively modest bandwidth. In other words, in some embodiments the system depicted in FIG. 3 may be used as a standalone remote monitoring solution. In such case, all video streams to be monitored may be downscaled to generate respective thumbnail streams, which may be encoded and distributed through an origin server and a CDN network to a remote monitoring computer system located in a remote monitoring site.

FIG. 4 illustrates other aspects of an exemplary remote MCR monitoring system according to one or more embodiments of the subject disclosure.

FIG. 4 shows a remote monitoring system 100c which combines the remote monitoring components of the system 100a of FIG. 1 with that of the system 100b of FIG. 3. The system 100c of FIG. 4 therefore advantageously combines the full resolution low latency streaming remote monitoring of FIG. 1 with the thumbnail streams and alarms remote monitoring of FIG. 3. This comprehensive system 100c may advantageously be used by remote technicians with a high bandwidth connection and enables a more comprehensive form of remote monitoring.

MCRs are typically equipped with numerous systems and tools for automatic detection of common audio or video quality issues—such as loss of video (black frame detection), loss of audio, video pixelation due to lossy channels, etc. Upon detection of such conditions, alarms are automatically sent to technicians who can then verify the severity of the issue and take appropriate action.

In a remote monitoring system, such as the ones described in the present subject disclosure, these automated tools can advantageously be leveraged to prioritize the streams that are pushed to the remotely located technician.

Figure 5:
FIG. 5 illustrates an exemplary mosaic of monitored video streams display by a remote monitoring device in accordance with one or more embodiments.

In one or more embodiments, an MCR monitoring engine, for example implemented in a monitoring server of the MCR, may be configured for, upon detection of an issue for a particular channel, sending an alarm to a user interface (for example, a dashboard) of a remote monitoring application implemented in a remote monitoring computer system or device used by a technician at a remote monitoring location. In some embodiments, the alarm may be transmitted to the remote monitoring application along with the feeds from the two monitoring points immediately before and after the point in the headend workflow at which the issue occurs. In some embodiments, these feeds may be highlighted on the remote monitoring application to further draw the attention of the technician, for instance by expanding their window to occupy a larger portion of a viewing screen (as illustrated in FIG. 5), or by flashing the window on the screen or other such measures.

To further prioritize the channel(s) where issues have been automatically detected, in one or more embodiments, streaming of the other channels (where no issues are detected by the automated tools) to the remote location can either be halted (until manually overridden by the technician) or done at a lower bit-rate so as to provide maximum bandwidth to the channel(s) experiencing issues. In particular, the alarms themselves—which may be sent in the form of short text messages—may be prioritized over the video feeds and sent immediately. The remote monitoring application may therefore be configured to update accordingly the configuration of the source encoding, the thumbnail generation and/or the thumbnail multiplexing in order to prioritize one or more channels for which issues have been detected. Such configuration update may be performed upon a user input from the technician operating the remote monitoring, or automatically upon receipt of alert data related to an issue occurring for a channel.

For purposes of encoding a video stream, the images (also referred to as "frames") of a video stream to be encoded may be considered sequentially and divided into blocks of pixels that are processed sequentially, for example starting at the top left and finishing at the bottom right. These blocks of pixels are predicted based on a correlation that exists between the pixels, which correlation may be either spatial (in the same frame) or temporal (in previously encoded frames). This prediction makes it possible to calculate the lowest possible pixel residual that is then transmitted to the decoder after transformation and quantization, in order to limit the side of the binary stream at the output of the encoder.

Video encoding/compression standards typically define and use different prediction modes depending on whether they use spatial and/or temporal correlation-based prediction:

In a first mode called the "intra" mode, a block of pixels of a current frame is predicted based on previously coded adjacent pixels present in the current frame. Depending on the encoder, different prediction directions may be used to predict an intra block. The encoder may generate, as part of the output encoding data which is provided to the decoder, data relating to the pixel residual and to the corresponding intra direction.

In another mode called the "inter" mode, a block of pixels of a current frame is predicted using pixels from one or more previously coded frames (other than the current frame), usually called reference frames. The block may be predicted based on one or on a plurality of reference frames. A motion estimation may be carried out, and a motion vector determined based on each reference frame. It is therefore possible to use a single motion vector or two motion vectors that point to potentially different reference frames to predict a block in inter mode. The encoder may generate, as part of the output encoding data which is provided to the decoder, data relating to the pixel residual and to the motion vector(s).

In yet another prediction mode used by some encoders, called the "skip" mode, as in the case of the inter mode, a block of pixels is predicted using pixels from previously coded frames. However for the skip mode only data related to the motion vectors may be transmitted to the decoder, the pixel residual being zero. This means that the block chosen in another frame will be copied exactly in order to obtain the current block. The second difference is that the vectors used for this mode are determined by the decoder in a list of possible vectors, called predictor vectors, thereby making it possible to transmit only the position of the predictor in a dictionary rather than transmitting its value.

Usually, a combination of all three modes is employed to provide an optimal balance between coding efficiency, random access capability, and robustness to errors and packet drops.

Video compression schemes also usually use the group of pictures (GOP) concept to define an order in which the images of a video chunk are arranged. A GOP is typically repeated periodically until the end of the encoding, and includes the following types of frame:

Type I (Intra) frames: this type of frame uses only the intra prediction mode. It therefore characterizes a frame irrespective of the other frames of the stream, in that it is sufficient in itself to be decoded, Type P (Predictive) frames: This type of frame uses the three intra, inter and skip prediction modes. The temporal correlation-based prediction is performed using only past frames in the stream among frames that have already been encoded.

Type B (Bidirectional) frames: This type of prediction also uses the three intra, inter and skip prediction modes, but the temporal correlation-based prediction may use past frames and/or future frames, as long as these are previously encoded frames.

There are two types of GOP: closed GOPs, that can be decoded independently, and open GOPs that are more efficient in terms of compression, but some frames of which may not be decoded in the following GOP.

A fixed GOP is a GOP whose order is constant every N images, N being a predetermined number.

Therefore the pattern of encoding modes is repeated in a GOP, each pattern being referred to as a GOP structure.

In one or more embodiments, in cases where one or more issues impacting one or more channels are detected, to further reduce the latency of the impacted channels, the GOP structure used to encode the impacted channels may automatically be modified to only include the first two modes (i.e. Intra coded frames (I-frames) and frames predicted from previously encoded frames (P-frames)). This may advantageously minimize encoder latency, possibly at the expense of a loss in compression efficiency—which however can be compensated for by reducing the bitrate of other channels.

As discussed above, a chunked encoding and transfer mechanism may be used to achieve low latency streaming. In this mechanism, the encoder would encode several frames (amounting to typically a time period of 100 to 200 ms) and then packetize them and send them out to a server of a CDN network such as the server 102a of the CDN 102 of FIGS. 1 and 4.

To further reduce latency in case an issue is detected, the chunking mechanism of the monitoring streams of the impacted channels may in one or more embodiments be automatically modified to include a single frame per chunk, enabling each frame to be immediately transmitted upon encoding and encryption. While this may reduce compression efficiency, the encoder latency may advantageously be reduced from around the 100 ms-200 ms range down to approximately 30 ms.

In one or more embodiments, once the technician has fixed the issue and cleared the alarm, both the GOP structure and chunking mechanism can revert to their default settings meant to optimize the combination of compression efficiency and media quality.

The proposed method may in some embodiments use an alarm probing mechanism according to which a technician probes one or more proposed servers/engines for status and may receive in response one or more alarms. Alternatively, the proposed servers/engines may be configured to, upon generating an alarm, send an alarm signal to the technician at the remote monitoring location.

Depending on the embodiment, each of the servers/engines used for implementing the proposed method, including without limitation the monitoring servers 104 (such as illustrated on FIGS. 1, 3 and 4), the multiplexing engine 107 (such as illustrated on FIGS. 3 and 4), and the thumbnail generation engine 105 (such as illustrated on FIGS. 3 and 4), may be configured to be remotely configured by a technician based in the remote monitoring location through a user interface configured on the remote monitoring computer system used by the technician, possibly through a management and control server 106a such as illustrated on FIGS. 3 and 4.

Figure 6:
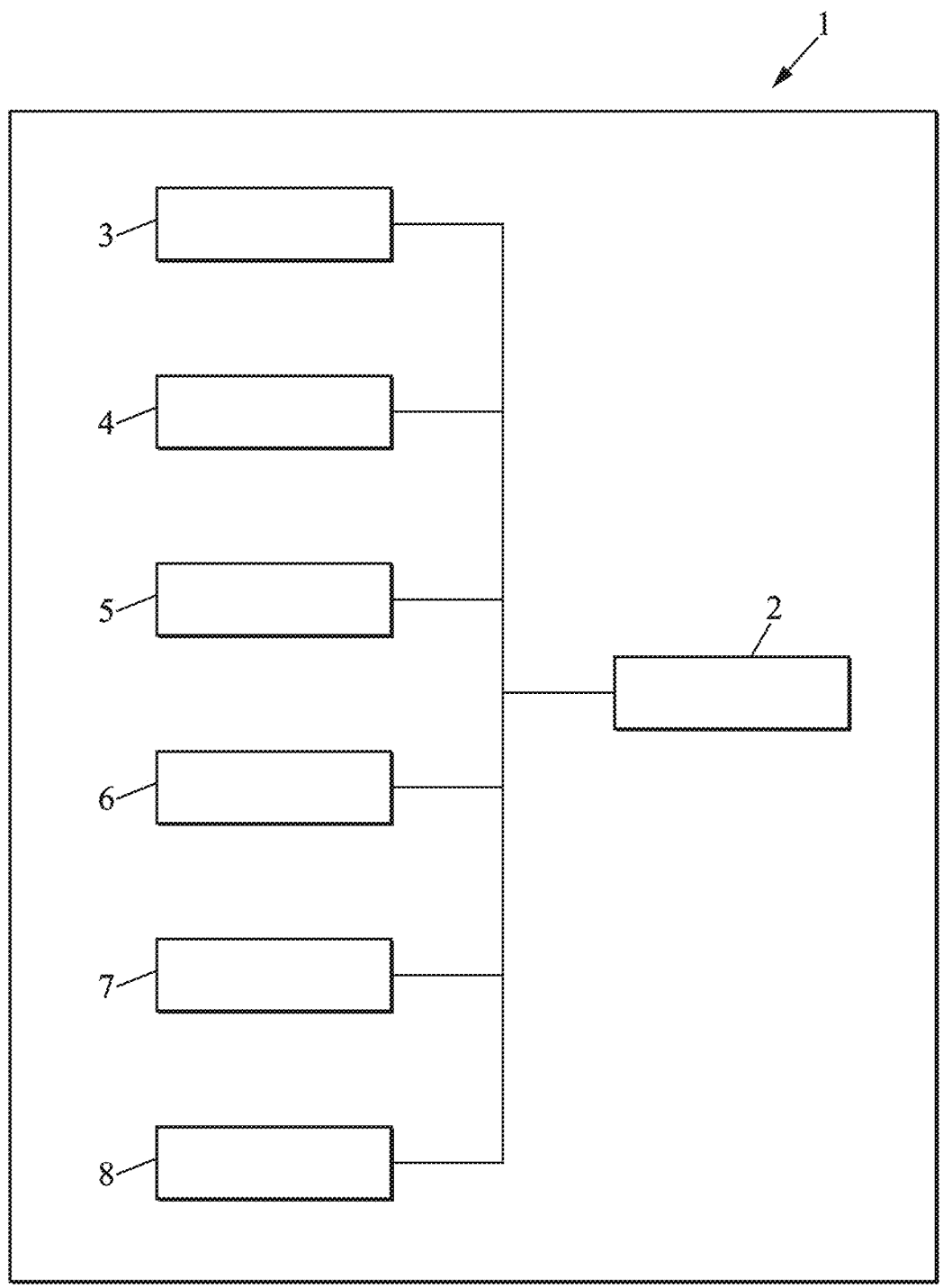
FIG. 6 is a block diagram of an exemplary remote monitoring apparatus in accordance with one or more embodiments.

FIG. 6 illustrates an exemplary apparatus or unit 1 configured to serve as a video monitoring headend device in accordance with embodiments of the present subject disclosure.

The apparatus 1, which may comprise one or more computers, includes a control engine 2, a remote monitoring engine 3, a source encoding engine 4, a thumbnail generation engine 5, a multiplexing engine 6, a data communication engine 7, and a memory 8.

In the architecture illustrated on FIG. 6, all of the remote monitoring engine 3, source encoding engine 4, thumbnail generation engine 5, multiplexing engine 6, data communication engine 7, and memory 8 are operatively coupled with one another through the control engine 2.

In some embodiments, the remote monitoring engine 3 is configured to perform various aspects of embodiments of one or more of the proposed methods for remote monitoring as described herein, such as without limitation related to issue detection, alarm/alert analysis and management, remote monitoring service configuration and monitoring service configuration.

In some embodiments, the source encoding engine 4 is configured to perform various aspects of embodiments of one or more of the proposed methods for remote monitoring as described herein, such as without limitation related to source encoding of video streams to be monitored.

In some embodiments, the thumbnail generation engine 5 is configured to perform various aspects of embodiments of one or more of the proposed methods for remote monitoring as described herein, such as without limitation related to video stream downscaling, thumbnail generation based on video streams to be monitored, and transmission thereof.

In some embodiments, the multiplexing engine 6 is configured to perform various aspects of embodiments of one or more of the proposed methods for remote monitoring as described herein, such as without limitation related to multiplexing a plurality of thumbnails generated based on video streams to be monitored and generating one or more mosaic streams based on multiplexed thumbnails.

In some embodiments, the data communication engine 7 is configured to perform aspects of embodiments of one or more of the proposed methods for remote monitoring as described herein related to data communication, such as without limitation transmission of encoded video data to a remote monitoring device located at a remote monitoring site, for example using one or more data plane communication protocols over a CDN network through a CDN server, and control data communication with the remote monitoring device for transmission of service thumbnails, alarm data, configuration data, for example using one or more control plane communication protocols, possibly over a VPN and through a control and management server.

The control engine 2 includes a processor, which may be any suitable microprocessor, microcontroller, Field Programmable Gate Arrays (FPGA), Application Specific Integrated Circuits (ASIC), Digital Signal Processing chip, and/or state machine, or a combination thereof. According to various embodiments, one or more of the computers used for implementing the proposed methods can be configured as a multi-processor computer having multiple processors for providing parallel computing. The control engine 2 may also comprise, or may be in communication with, computer storage media, such as, without limitation, the memory 8, capable of storing computer program instructions or software code that, when executed by the processor, causes the processor to perform various acts of the methods described herein. In addition, the memory 5 may be any type of data storage computer storage medium, capable of storing a data structure representing a computer network to which the apparatus 1 belongs, coupled to the control engine 2 and operable with the remote monitoring engine 3, the source encoding engine 4, the thumbnail generation engine 5, the multiplexing engine 6, and the data communication engine 7 to facilitate management and processing of data stored in association therewith.

In embodiments of the present subject disclosure, the apparatus 1 is configured for performing one or more of the remote monitoring methods described herein. The apparatus 1 may in some embodiments be part of an MCR as a remote monitoring apparatus of the MCR, and configured to operate with the video stream monitoring apparatus of the MCR or be implemented as a sub-system of such video stream monitoring apparatus.

It will be appreciated that the apparatus 1 shown and described with reference to FIG. 6 is provided by way of example only. Numerous other architectures, operating environments, and configurations are possible. Other embodiments of the apparatus may include fewer or greater number of components, and may incorporate some or all of the functionality described with respect to the apparatus components shown in FIG. 6. Accordingly, although the control engine 2, remote monitoring engine 3, source encoding engine 4, thumbnail generation engine 5, multiplexing engine 6, data communication engine 7, and memory 8 are illustrated as part of the apparatus 1, no restrictions are placed on the location and control of components 2-8. In particular, in other embodiments, components 2-8 may be part of different entities, servers, or computing systems.

For example, a video monitoring headend device according to embodiments of the present subject disclosure may comprise a source encoder or a video encoding engine (comprised in a video broadcasting headend), which comprises a source encoder processor and a source encoder memory operatively coupled to the source encoder processor, wherein the source encoder processor may be configured for implementing a video monitoring method as proposed in the present subject disclosure, and in particular a method comprising: generating encoded multimedia content signals based on the encoding of monitored video streams respectively corresponding to one or more monitoring points along a workflow chain of the video broadcasting headend configured for one or more video channels broadcasted by the headend, and transmitting the encoded multimedia content signals to a remote monitoring device through a content distribution network.

Likewise, a remote video monitoring device according to the present subject disclosure may comprise a remote monitoring device processor and a remote monitoring device memory operatively coupled to the remote monitoring device processor, wherein the remote monitoring device processor may be configured for: receiving the encoded multimedia content signals; and displaying one or more of the received encoded multimedia content signals for monitoring the corresponding monitored video streams.

In one or more embodiments, a remote video monitoring device, such as the one 103a illustrated on FIGS. 1, 3, and 4, may be implemented in software, in hardware, or as a combination thereof. When implemented as a software, the remote video monitoring device may be implemented as an application configured to be executed on a computer platform, such as a general-purpose computer system (for example a personal computer). In some embodiments, the remote video monitoring application may be web-based, and may be executed through a web browser. In such cases the application may advantageously be usable on computer equipment that is suitable for remote working (e.g. home working), such as a laptop computer. In other embodiments, the remote video monitoring application may be cloud-based, in which cases it may comprise multiple parts, among which a software executed on a computer system suitable for use in a remote working context.

The proposed method may be used for the monitoring of one or more video streams based on one or more predefined monitoring points, for example over a workflow applied to video streams.

While various embodiments have been described, those skilled in the art will readily appreciate that various changes and/or modifications can be made without departing from the spirit or scope defined by the appended claims.

It should be understood that certain advantages, features and aspects of the systems, devices, and methods may be realized in a variety of other embodiments. Additionally, it is contemplated that various aspects and features described herein can be practiced separately, combined together, or substituted for one another, and that a variety of combination and sub-combinations of the features and aspects can be made and still fall within the scope of the disclosure. Furthermore, the systems and devices described above need not include all of the modules and functions described in the preferred embodiments.

Information and signals described herein can be represented using any of a variety of different technologies and techniques. For example, data, instructions, commands, information, signals, bits, symbols, and chips can be represented by voltages, currents, electromagnetic waves, magnetic fields or particles, optical fields or particles, or any combination thereof.

Depending on the embodiment, certain acts, events, or functions of any of the methods described herein can be performed in a different sequence, may be added, merged, or left out altogether (e.g., not all described acts or events are necessary for the practice of the method). Moreover, in certain embodiments, acts or events may be performed concurrently rather than sequentially.

The invention claimed is:

1. A method for monitoring video streams comprising:
generating, by one or more source encoders, encoded multimedia content signals based on the encoding of monitored video streams, wherein a plurality of the monitored video streams respectively correspond to a plurality of monitoring points along a workflow chain within a video broadcasting headend configured for broadcasting one or more video channels;
transmitting the encoded multimedia content signals to a remote monitoring device through a content distribution network.

2. The method according to claim 1, wherein the encoded multimedia content signals are transmitted to the remote monitoring device using low latency chunk encoding and transfer mechanisms.

3. The method according to claim 1, further comprising:
receiving, by a player comprised in the remote monitoring device, the encoded multimedia content signals; and
displaying one or more of the received encoded multimedia content signals for monitoring the corresponding monitored video streams.

4. The method according to claim 1, wherein one or more of the monitored video streams are downscaled by one or more downscaling engines prior to being encoded to generate the encoded multimedia content signals.

5. The method according to claim 4, further comprising:
receiving, by the remote monitoring device, a second user input for configuring the downscaling performed by the one or more source encoders;
transmitting, by the remote monitoring device, to the one or more downscaling engines, downscaling configuration data based on the second user input; and
configuring the one or more downscaling engines based on received downscaling configuration data.

6. The method according to claim 4, further comprising:
multiplexing, by one or more video multiplexing engines, a plurality of downscaled monitored video streams prior to being encoded by the one or more source encoders into the encoded multimedia content signals.

7. The method according to claim 1, further comprising:
receiving, by the remote monitoring device, a first user input for configuring the one or more source encoders;
transmitting, by the remote monitoring device, to the one or more source encoders, source encoding configuration data based on the first user input;
configuring the one or more source encoders based on received source encoding configuration data.

8. The method according to claim 1, further comprising:
upon detection of an issue on an impacted video channel broadcasted by the headend corresponding to an issue point of the workflow chain for the impacted video channel, generating an alarm signal based on the detected issue, and
monitoring first and second video streams of the impacted video channel, wherein the first video stream corresponds to a first monitoring point along the workflow chain before the issue point along the workflow chain, and the second video stream corresponds to a second monitoring point along the workflow chain after the issue point along the workflow chain.

9. The method according to claim 1, further comprising:
upon detection of an issue on an impacted video channel broadcasted by the headend, generating an alarm signal based on the detected issue, and prioritizing the monitoring of the impacted video channel over other video channels broadcasted by the headend.

10. The method according to claim 1, further comprising:
upon detection of an issue on an impacted video channel broadcasted by the headend, monitoring one or more video streams of the impacted video channels, wherein a Group Of Picture, GOP, structure of a monitored video stream of the impacted video channel is modified to only include I video frames and/or P video frames.

11. A method for monitoring video streams comprising, at a remote monitoring device:
receiving encoded multimedia content signals generated based on monitored video streams, wherein a plurality of the monitored video streams respectively correspond to a plurality of monitoring points along a workflow chain within a video broadcasting headend configured for broadcasting one or more video channels; and
displaying one or more of the received encoded multimedia content signals for monitoring the corresponding monitored video streams.

12. A video stream monitoring system comprising a source encoder comprised in a video broadcasting headend, and a remote monitoring device, wherein:
- the source encoder comprises a source encoder processor and a source encoder memory operatively coupled to the source encoder processor, wherein the source encoder processor is configured for:
  - generating encoded multimedia content signals based on the encoding of monitored video streams, wherein a plurality of the monitored video streams respectively correspond to a plurality of monitoring points along a workflow chain within the video broadcasting headend configured for broadcasting one or more video channels;
  - transmitting the encoded multimedia content signals to the remote monitoring device through a content distribution network; and
- the remote monitoring device comprises a remote monitoring device processor and a remote monitoring device memory operatively coupled to the remote monitoring device processor, wherein the remote monitoring device processor is configured for:
  - receiving the encoded multimedia content signals;
  - displaying one or more of the received encoded multimedia content signals for monitoring the corresponding monitored video streams.

13. A video monitoring headend device comprising a source encoder comprised in a video broadcasting headend, wherein the source encoder comprises a source encoder processor and a source encoder memory operatively coupled to the source encoder processor, wherein the source encoder processor is configured for:
- generating encoded multimedia content signals based on the encoding of monitored video streams, wherein a plurality of the monitored video streams respectively correspond to a plurality of monitoring points along a workflow chain within the video broadcasting headend configured for broadcasting one or more video channels; and
- transmitting the encoded multimedia content signals to a remote monitoring device through a content distribution network.

14. The video monitoring headend device according to claim 13, wherein the encoded multimedia content signals are transmitted to the remote monitoring device using low latency chunk encoding and transfer mechanisms.

15. The video monitoring headend device according to claim 13, wherein the source encoder processor is further configured for:
- receiving, by a player comprised in the remote monitoring device, the encoded multimedia content signals; and
- displaying one or more of the received encoded multimedia content signals for monitoring the corresponding monitored video streams.

16. The video monitoring headend device according to claim 13, wherein one or more of the monitored video streams are downscaled by one or more downscaling engines prior to being encoded to generate the encoded multimedia content signals.

17. The video monitoring headend device according to claim 16, wherein the source encoder processor is further configured for:
- receiving, by the remote monitoring device, a second user input for configuring the downscaling performed by the one or more source encoders;
- transmitting, by the remote monitoring device, to the one or more downscaling engines, downscaling configuration data based on the second user input; and
- configuring the one or more downscaling engines based on received downscaling configuration data.

18. The video monitoring headend device according to claim 13, wherein the source encoder processor is further configured for:
- receiving, by the remote monitoring device, a first user input for configuring the one or more source encoders;
- transmitting, by the remote monitoring device, to the one or more source encoders, source encoding configuration data based on the first user input;
- configuring the one or more source encoders based on received source encoding configuration data.

19. A remote video monitoring device comprising a remote monitoring device processor and a remote monitoring device memory operatively coupled to the remote monitoring device processor, wherein the remote monitoring device processor is configured for:
- receiving the encoded multimedia content signals of claim 13; and
- displaying one or more of the received encoded multimedia content signals for monitoring the corresponding monitored video streams.

20. A non-transitory computer-readable medium encoded with executable instructions which, when executed, causes an apparatus comprising a processor operatively coupled with a memory, to perform a method for monitoring video streams comprising:
- generating, by one or more source encoders, encoded multimedia content signals based on the encoding of monitored video streams, wherein a plurality of the monitored video streams respectively correspond to a plurality of monitoring points along a workflow chain within a video broadcasting headend configured for broadcasting one or more video channels; and
- transmitting the encoded multimedia content signals to a remote monitoring device through a content distribution network.

* * * * *